United States Patent [19]

Tsuchiya et al.

[11] Patent Number: 4,788,246

[45] Date of Patent: Nov. 29, 1988

[54] CATIONIC MICRO GEL PARTICLE DISPERSION AND A COATING COMPOSITION THEREFROM

[75] Inventors: Yasuyuki Tsuchiya, Hirakata; Kenshiro Tobinaga, Kawanishi, both of Japan

[73] Assignee: Nippon Paint Co., Ltd., Osaka, Japan

[21] Appl. No.: 126,963

[22] Filed: Nov. 30, 1987

[30] Foreign Application Priority Data

Nov. 28, 1986 [JP] Japan .................................. 61-285770
Nov. 28, 1986 [JP] Japan .................................. 61-285771
Jan. 7, 1987 [JP] Japan .................................. 62-1334
Sep. 4, 1987 [JP] Japan .................................. 62-222687
Sep. 4, 1987 [JP] Japan .................................. 62-222688

[51] Int. Cl.$^4$ .................... C25D 13/06; C08L 63/00; C08K 3/00
[52] U.S. Cl. .................... 524/554; 204/181.7; 428/402.24; 523/404; 523/414; 523/424; 524/407; 524/413; 524/439; 524/446; 524/510; 524/901
[58] Field of Search .............. 524/439, 510, 901, 554, 524/407, 413, 446; 523/414, 424, 404; 428/402.24

[56] References Cited

U.S. PATENT DOCUMENTS

| | | | |
|---|---|---|---|
| 4,419,468 | 12/1983 | Lucas | 523/414 |
| 4,420,574 | 12/1983 | Moriarity et al. | 524/901 |
| 4,468,307 | 8/1984 | Wismer et al. | 523/414 |
| 4,501,833 | 2/1985 | Bosso et al. | 524/901 |
| 4,511,446 | 4/1985 | Abbey et al. | 428/461 |
| 4,512,860 | 4/1985 | Abbey et al. | 428/461 |
| 4,561,952 | 12/1985 | Mels et al. | 524/901 |
| 4,732,950 | 3/1988 | Nagai et al. | 524/901 |

Primary Examiner—Herbert J. Lilling
Attorney, Agent, or Firm—Wenderoth, Lind & Ponack

[57] ABSTRACT

Disclosed is a micro gel particle having a cationic charge, which is electrodepositable. The micro gel particle is obatined in the form of aqueous dispersion. The micro gel particle dispersion is prepared by a process comprising emulsifying in an aqueous medium a resin composition comprising
  (A) 100 parts by weight of a cationic film-forming aqueous resin, and
  (B) 10 to 250 parts by weight of a thermosetting crosslinking agent which is self-crosslinked or crosslinked with said aqueous resin (A) in terms of condensation or addition reaction;

parts by weight being based on the solid content of the resin composition, and heating the resultant emulsion to above a crosslinkable temperature of said crosslinking agent (B).

11 Claims, No Drawings

CATIONIC MICRO GEL PARTICLE DISPERSION AND A COATING COMPOSITION THEREFROM

FIELD OF THE INVENTION

The present invention relates to a process for preparing a cationic micro gel particle dispersion and a coating composition obtained therefrom.

BACKGROUND OF THE INVENTION

It has been known to obtain an article having matte surface by electrocoating with electrodepositable paint containing internally crosslinked micro resin particles (hereinafter referred to as "micro gel particles") prepared by polymerizing an ethylenically unsaturated monomer (see Japanese patent publication (unexamined) Nos. 93762/1983 and 49766/1981). The micro gel particles are advantageous not only in providing matte surface, but also in coating properties and throw power.

The micro gel particles, however, should be mixed with a resin which is water-soluble or water-dispersible and which has charges necessary for electrodeposition if it is applied for electrocoating, because they do not have suitable charges and are insoluble in an aqueous medium. On the other hand, the micro gel particles deteriorate storage stability and workability of electrocoating and it therefore is difficult to formulate in a large amount into a paint.

Japanese patent publication (unexamined) No. 31199/1986 discloses a water dispersion prepared by neutralizing a heat reaction product of an alpha,beta-ethylenically unsaturated polycarboxylic acid resin and an alcoxylated methylol melamine. The dispersion is used for providing a matte surface by electrocoating. The dispersion is not cationic but anionic.

SUMMARY OF THE INVENTION

The present invention is to provide a micro gel particle having a cationic charge, which is electrodepositable. The micro gel particle is obtained in the form of aqueous dispersion. The micro gel particle dispersion is prepared by a process comprising
emulsifying in an aqueous medium a resin composition comprising
(A) 100 parts by weight of a cationic film-forming aqueous resin, and
(B) 10 to 250 parts by weight of a thermosetting crosslinking agent which is self-crosslinked or crosslinked with said aqueous resin (A) in terms of condensation or addition reaction;
parts by weight being based on the solid content of the resin composition, and
heating the resultant emulsion to above a crosslinkable temperature of said crosslinking agent (B).

The micro gel particle thus obtained has a crosslinked portion inside of the particle and is covered with the aqueous resin over said crosslinked portion, whereby it seems that the micro gel particle has a shell-core construction wherein the core is the crosslinked portion and the shell is the aqueous resin. The micro gel particle is electrodepositable due to cationic charge.

The present invention additionally provides an aqueous coating composition containing the above micro gel particle.

DETAILED DESCRIPTION OF THE INVENTION

The cationic film-forming aqueous resin (A) is generally employed as a film-forming resin in the formulation of a cationic electrocoating composition. The resin (A) has a cationic functional group which is given a positive charge and hydrophilic nature to the resin, such as an amino group. Such resins are known to the art and all of them can be used in the present invention. Preferred aqueous resins are an epoxy resin having amino groups and a polybutadiene resin having amino groups (hereinafter referred to as "aminated polybutadiene").

The epoxy resin having amino groups may be prepared by reacting a polyglycidyl compound with a primary or secondary amine. The polyglycidyl compound herein is meant an epoxy compound which has at least two glycidyl groups in one molecule. The compound may be obtained by reacting an aromatic or aliphatic alcohol with epihalohydrin. Such polyglycidyl compounds are commercially available, for example, bisphenol type from Toto-kasei K.K. as Epototo YD-011; aliphatic type from Nagase-kasei K.K. as Denacol EX-212 and from Toto-kasei K.K. as PG-207; and phenol novolak type from Toto-kasei K.K. as Epototo YDPN-638. Examples of the primary or secondary amines to be added to the polyglycidyl compounds are primary amines, such as monomethylamine, monoethylamine, n-butylamine, monoethanolamine and the like; and secondary amines, such as dimethylamine, diethylamine, diisopropylamine, N-methylethanolamine, N-ethylethanolamine, diethanolamine and the like. The amines may be diketimine which is obtained by dehydration-reation of diethylenetriamine and methyl isobutyl ketone. The amines generally are reacted with the polyglycidyl compounds in an equivalent amount approximately equal to an epoxy equivalent amount of the polyglycidyl compound.

The aminated polybutadiene may be prepared by oxidizing liquid polybutadiene having a molecular weight of 500 to 5,000 with an peroxide in an amount ratio sufficient to form 3 to 12% by weight of an oxirane oxygen atom, followed by reacting the resultant polybutadiene with a primary or secondary amine in an amount of 30 to 300 mmol per 100 g of the polybutadiene. Details of such an aminated polybutadiene are described in Japanese patent publication (unexamined) Nos. 60273/1985 and 60274/1985. The polybutadiene can form an aqueous solution or aqueous dispersion by neutralizing an acid and then diluting with water.

The thermosetting crosslinking agent (B), which can be self-crosslinked or crosslinked with the aqueous resin (A) in terms of condensation or addition reaction, includes etherified methylol phenols, preferably beta-hydroxyphenol ethers. When the aminated polybutadiene contains remaining oxirane oxygen atoms, the etherified methylolphenols may combined with tetrabromobisphenol A.

The methylolphenols are those obtained by reacting phenol, such as phenol, p-cresol, p-t-butylphenol, amilphenol, p-phenylphenol and bisphenol A, with formaldehyde in the presence of an alkali catalyst. The etherified methylolphenols are generally prepared by partially or completely etherifying the phenolic OH group of the methylolphenols with a suitable etherifying agent. Examples of the etherifying agents are a monoepoxy compound, and a compound having the following formula:

R-X wherein R represents methyl, allyl, benzyl, oxirane and the like, and X represents a halogen atom. In case where the etherifying agent is the monoepoxy compound, the product reacted is beta-hydroxyphenol ether which is highly reactive and this is preferred.

The crosslinking agent (B) should be reactive at a temperature of less than about 100° C. at atmospheric pressure, because crosslinking reaction is conducted in an aqueous medium. However, if the reaction is conducted under pressure in an autoclave, the crosslinking agent may be one which is reactive at more than 100° C.

For lowering the viscosity of the resin composition of the aqueous resin (A) and the crosslinking agent (B) to emulsify with ease, the aqueous medium may further contain an organic solvent. Examples of the organic solvent are a water-miscible organic solvent, such as ethylene glycol monoethyl ether, ethylene glycol monopropyl ether, ethylene glycol monobutyl ether, methanol, ethanol, isopropyl alcohol, n-butanol, isobutanol, ethylene glycol dimethyl ether, diacetone alcohol, 4-methoxy-4-methylpentanone-2, acetone, methyl ethyl ketone, methoxy butanol, dioxane, ethylene glycol monoethyl ether acetate and the like; and a water-immiscible organic solvent, such as xylene, toluene, methyl isobutyl ketone, hexane, carbon tetrachloride, 2-ethylhexanol, isophorone, cyclohexane, benzene and the like.

For promoting the crosslinking reaction, the resin composition of the aqueous resin (A) and crosslinking agent (B) may further contain a catalyst. In case where the crosslinking agent is beta-hydroxyphenol ether, preferred catalysts are dinonylnaphthalene sulfonic acid and dinonylnaphthalene disulfonic acid.

Where the resin composition containing the aqueous resin (A) and the crosslinking agent (B) is emulsified in an aqueous medium, at least 20 mol % of the amino group in the aqueous resin (A) is primarily neutralized with an acid and it is emulsified together with the crosslinking agent (B) and the aqueous medium. An amount of the crosslinking agent (B) may be 10 to 250 parts by weight per 100 parts by weight of the aqueous resin (A), calculated in terms of the solid content. The acid for neutralizing the aqueous resin (A) includes acetic acid, propionic acid, lactic acid and the like.

The aqueous medium is primarily water. It can contain a surfactant for facilitating emulsification. Examples of the surfactants are a nonionic surfactant, such as polyethylene glycol alkylphenyl ether, polyethylene glycol alkyl ether, polyoxyalkylene alkyl ether, polyethylene glycol sorbitane monostearate, polypropylene glycol polyethylene glycol ether and the like; and a cationic surfactant, such as lauryltrimethylammonium chloride, distearyldimethylammonium chloride, alkylpicolinium chloride and the like.

It is preferred that the solvent in the emulsion is azeotropically removed from the emulsion before or during heating thereafter. Removal of the solvent may facilitate crosslinking reaction.

The emulsion thus obtained is heated to above a crosslinkable temperature at atmospheric pressure or under pressure in accordance with the sort of the crosslinking agent (B) to obtain an aqueous dispersion of the cationic micro gel particle of the present invention.

The micro gel particle has an electric charge on the surface and stably dispersed in water due to its repulsion force. The obtained emulsion has stable to heat and therefore can proceed the crosslinking reaction of the crosslinking agent (B). The termination of crosslinking reaction can be identified by adding a solvent capable of dissolving a resin, such as tetrahydrofuran. When crosslinking reaction dose not occur, the emulsion turns to transparent, and if crosslinking reaction is conducted, the solution turns to turbid white. The obtained aqueous dispersion of the cationic micro gel particle can be used in neat or the micro gel particle which is taken out from the dispersion by vacuum drying can also be used.

In another embodiment of the present invention, a solid particle was added in the emulsion before heating to form a micro gel particle containing a solid particle as a core. By "micro gel particle dispersion" herein is meant a dispersion containing a micro gel particle containing a solid particle therein as a core. The solid particle for this embodiment is a particle which is not dissolved with the crosslinking agent and an organic solvent therein and includes a pigment and a crosslinked gel particle. Examples of the pigments are iron oxide, strontium chromate, zinc chromate, carbon black, titanium dioxide, talc, aluminum silicate, precipitated barium sulfate, basic lead sulfate, aluminum phosphomolybdate, a metallic pigment such as zinc powder, and an extender pigment.

The aqueous dispersion of the cationic micro gel particle can be used as an aqueous coating composition, especially a cationic electrocoating composition. The aqueous coating composition may further contain a water soluble or water dispersible cationic film-forming resin if desired. The coating composition may separately contain a pigment. Examples of the pigments are a color pigment, such as titanium dioxide, iron oxide red, carbon black and the like; an extender pigment, such as aluminum silicate, precipitated barium sulfate and the like; and a corrosion-preventive pigment, such as aluminum phosphomolybdate, strontium chromate, basic lead silicate, lead chromate and the like. The electrocoating composition preferably adjusts the solid content to 10 to 20% by weight. The electrocoating composition is generally electrodeposited to form a film having a dried thickness of 15 to 30 micron and baked to cure.

EXAMPLES

The present invention is illustrated by the following examples, which are not to be construed as limiting the invention to their details. In the examples, part and % are based on weight unless otherwise indicated.

PRODUCTION EXAMPLE 1

Aminated polybutadiene A

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. Unreacted dimethylamine was removed by distillation to obtain an aminated polybutadiene. The aminated polybutadiene had an amine value of 120 mmol/100 g (solid content) and a nonvolatile content of 75%.

PRODUCTION EXAMPLE 2

Aminated polybutadiene B

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. After removing unreacted dimethylamine by distillation, the resultant product was cooled to 120° C. and a mixture containing 79.3 g of acrylic acid, 7.6 g of hydroquinone and 26.4 g of ethylene glycol monoethyl ether was added to be allow to react at 120° C. for 3¾ hours. The aminated polybutadiene had an amine value of 85.2 mmol/100 g (solid content), an acid value of 10.0 mmol/100 g and a solid content of 75.4%.

PRODUCTION EXAMPLE 3

Aminated epoxy resin

An aminated epoxy resin was prepared from the following ingredients.

| Ingredients | Parts by weight | Solid content |
|---|---|---|
| Epototo YD-012[1] | 700 | 700 |
| Ethylene glycol monobutyl ether | | 227 |
| Diethylamine | 73 | |

[1] An epoxy resin available from Toto-kasei K.K.

Epototo and ethylene glycol monobutyl ether were charged in a 2 liter autoclave and dissolved. Dimethylamine was added and heated to 100° C. at which temperature the mixture was allowed to react for 90 minutes. Unreacted amine was removed to obtain an aminated epoxy resin solution. The aminate epoxy resin had an amine value of 128 mmol/100 g (solid content) and a nonvolatile of 70.5%.

PRODUCTION EXAMPLE 4

Beta-hydroxyphenol ether

Beta-hydroxyphenol ether was prepared from the following ingredients.

| Ingredients | Parts by weight |
|---|---|
| Tamanol 722[1] | 60 |
| Butyl glycidyl ether | 23 |
| n-Butanol | 10 |
| Methoxybutanol | 10 |
| Bimethylbenzylamine | 0.4 |

[1] A resol type phenol resin available from Arakawa Kagaku K.K.

Tamanol 722 was charged in a reaction vessel to which methoxybutanol and n-butanol were added and then butyl glycidyl ether was added. The content was mixed uniformly and a temperature rises to 100° C., at which temperature dimethylbenzylamine was added to the content. Mixing was continued at 100° C. for 3 hour with paying attention to a rapid elevation of temperature, after which an amount of glycidyl group of the reaction product was measured to find less than 5% of the charged amount. The content was cooled to conduct an analysis. The analysis showed that phenolic OH group disappears and beta-hydroxyphenol ether compound having a methylol group and a secondary alcohol group was obtained.

PRODUCTION EXAMPLE 5

Quaternary ammonium resin

A quaternary ammonium resin was prepared from the following ingredients.

| Ingredients | Weight (g) |
|---|---|
| Epoxidized polybutadiene[2] | 1000 |
| Ethyleneglycol monobutyl ether | 349 |
| Dimethylamine | 46 |
| 50% lactic acid | 138 |
| Deionized water | 473 |
| Phenyl glycidyl ether | 117 |

[2] Available from Nippon Petrochemicals Co. Ltd. as E 1800-6.5.

The epoxidized polybutadiene and ethylene glycol monobutyl ether were charged in an autoclave and dimethylamine was added to be allowed to react at 150° C. for 5 hours. Unreacted amine was removed by distillation and then cooled to 60° C. A mixture containing 50% lactic acid and deionized water was added and kept at 80° C. for 30 minutes with stirring. Next, phenyl glycidyl ether was added to the reaction mixture and heated to 110° C. to react with stirring until an acid value became not more than 0.1, which is measured by a conventional method employing phenolphthalein as an indicator and alcoholic KOH as a normal solution. The obtained resin varnish had a nonvolatile content of 55%.

Pigment paste

A pigment paste was prepared from the following ingredients.

| Ingredients | Weight (g) |
|---|---|
| The quaternary ammonium resin varnish | 231 |
| Deionized water | 315 |
| Carbon black | 16 |
| Titanium dioxide | 92 |
| Kaoline | 220 |
| Basic lead silicate | 58 |
| Deionized water | 1633 |

The quaternary ammonium resin was dissolved in 316 g of deionized water and mixed using a disper for about one hour after the pigments are added. Glass beads were added to the mixture and ground using a sand mill to a particle size of less than 20 micron, after which second portion of deionized water was added to filter it. The filtrate had a nonvolatile content of 20%.

EXAMPLE 1

Resin emulsion A

A cationic micro gel particle dispersion was prepared from the following ingredients.

| Ingredients | Parts by weight | Solid content % |
|---|---|---|
| Aminated polybutadiene A | 100 | 75 |
| Tamanol 722 | 33.3 | 25 |
| Glacial acetic acid | 2.8 | |

| Ingredients | Parts by weight | Solid content % |
|---|---|---|
| Deionized water | 363.9 | |

Tamanol 722 and glacial acetic acid were added to aminated polybutadiene A and mixed. Deionized water was added to the resultant mixture and emulsified to form an resin emulsion A. A small portion of the emulsion A was added to 100 times amount of tetrahydrofuran to transparently dissolve.

Deionized water was further added to the emulsion A, while the solvent was removed under reduced pressure. The resin emulsion was allowed to stand at 95° C. for 6 hours and then cool to form a cationic micro gel particle dispersion. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 2

Resin emulsion B

A cationic micro gel particle dispersion was prepared from the following ingredients.

| Ingredients | Parts by weight | Solid content % |
|---|---|---|
| Aminated polybutadiene B | 100 | 75 |
| Tamanol 722 | 33.3 | 25 |
| Glacial acetic acid | 2.8 | |
| Deionized water | 363.9 | |

Tamanol 722 and glacial acetic acid were added to aminated polybutadiene B and mixed. Deionized water was added to the resultant mixture and emulsified to form an resin emulsion B. A small portion of the emulsion B was added to 100 times amount of tetrahydrofuran to transparently dissolve.

Deionized water was further added to the emulsion B, while the solvent was removed under reduced pressure. The resin emulsion was allowed to stand at 95° C. for 6 hours and then cool to form a cationic micro gel particle dispersion. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 3

Resin emulsion C

A cationic micro gel particle dispersion was prepared from the following ingredients.

| Ingredients | Parts by weight | Solid content % |
|---|---|---|
| Aminated epoxy resin | 107 | 75 |
| Tamanol 722 | 33.3 | 25 |
| Glacial acetic acid | 2.6 | |
| Deionized water | 357.1 | |

Tamanol 722 and glacial acetic acid were added to aminated epoxy resin and mixed. Deionized water was added to the resultant mixture and emulsified to form an resin emulsion C. A small portion of the emulsion C was added to 100 times amount of tetrahydrofuran to transparently dissolve.

Deionized water was further added to the emulsion C, while the solvent was removed under reduced pressure. The resin emulsion was allowed to stand at 95° C. for 6 hours and then cool to form a cationic micro gel particle dispersion. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 4

Four hundred gram of the cationic resin micro gel particle dispersion obtained in Example 1 was mixed with 100 g of the pigment paste and allowed to stand at 55° C. for 7 days and then cooled.

Cationic electrocoating was conducted using a degreased polished steel plate to be coated as a cathode in the cationic solution thus obtained. The coated article was baked at 170° C. for 20 minutes to obtain a coating having a thickness of 20 micron. Gloss was evaluated by inserting light at an angle of 60°. The result was shown in Table 1.

EXAMPLE 5

A cationic micro gel particle dispersion was obtained as generally described in Example 1 with the exception that the resin emulsion A was kept warm at 110° C. for 5 hours in an autoclave. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 6

Resin emulsion D

A cationic micro gel particle dispersion was prepared from the following ingredients.

| Ingredients | Parts by weight | Solid content % |
| --- | --- | --- |
| Aminated polybutadiene A | 66.7 | 50 |
| Beta-hydroxy phenol ether | 62.5 | 50 |
| Glacial acetic acid | 1.8 | |
| Deionized water | 369 | |

Beta-hydroxy phenol ether and glacial acetic acid were added to aminated polybutadiene A and mixed. Deionized water was added to the resultant mixture and emulsified to form an resin emulsion D. A small portion of the emulsion D was added to 100 times amount of tetrahydrofuran to transparently dissolve.

The resin emulsion was allowed to stand at 55° C. for 7 days and then cool to form a cationic micro gel particle dispersion. The dispersion does not dissolve in tetrahydrofuran but makes a turbid white solution.

A tin plate was dipped in the dispersion which was adjusted to a nonvolatile content of 10%, and dried by air and then under reduced pressure. The obtained tin plate was observed by a microscope to see a micro particle having a particle size of not more than 100 nm.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 7

Resin emulsion E

A cationic micro gel particle dispersion was prepared from the following ingredients.

| Ingredients | Parts by weight | Solid content % |
| --- | --- | --- |
| Aminated polybutadiene A | 66.7 | 50 |
| Tetrabromobisphenol A | 50 | 50 |
| Xylene | 10 | |
| Ethylene glycol monobutyl ether | 5 | |
| Ethylene glycol monoethyl ether | 5 | |
| Glacial acetic acid | 1.8 | |
| Deionized water | 361.5 | |

Tetrabromobisphenol A, xylene, ethylene glycol monobutyl ether and ethylene glycol monoethyl ether were added to aminated polybutadiene A and mixed. Deionized water was added to the resultant mixture and emulsified to form an resin emulsion E. A small portion of the emulsion E was added to 100 times amount of tetrahydrofuran to transparently dissolve.

The resin emulsion was allowed to stand at 55° C. for 7 days and then cool to form a cationic micro gel particle dispersion. The dispersion does not dissolve in tetrahydrofuran but makes a turbid white solution.

Cationic electrocoating was conducted using a degreased polished steel plate to be coated as a cathode in the cationic micro gel particle solution thus obtained. The coated article was baked at 170° C. for 20 minutes to obtain a clear coating having a thickness of 20 micron. Gloss was evaluated by inserting light at an angle of 60°. The result was shown in Table 1.

EXAMPLE 8

Four hundred gram of the cationic resin micro gel particle dispersion obtained in Example 6 was mixed with 100 g of the pigment paste and allowed to stand at 55° C. for 7 days and then cooled.

Cationic electrocoating was conducted using a degreased polished steel plate to be coated as a cathode in the cationic solution thus obtained. The coated article was baked at 170° C. for 20 minutes to obtain a coating having a thickness of 20 micron. Gloss was evaluated by inserting light at an angle of 60°. The result was shown in Table 1.

COMPARATIVE EXAMPLES 1 TO 3

Production and test were conducted as generally described in Example 1 with the exception that the resins emulsion A, B and C was not heated. By a dipping test using a tin plate, no micro particles are observed by a microscope. The result of the gloss test on an electrocoated plate is shown in Table 1.

COMPARATIVE EXAMPLE 4

One hundred gram of pigment paste of Production Example 5 was added to 400 g of the resin emulsion A before heating to form a cationic electrocoating composition. In the electrocoating composition, an article serving as a cathode was electrocoated and then baked at 170° C. for 20 minutes to obtain a cured coating having a thickness of 20 micron. The same test as Example 1 was conducted and the result is shown in Table 1.

COMPARATIVE EXAMPLES 5 AND 6

Production and test were conducted as generally described in Example 6 with the exception that the resins emulsion D and E was not heated. By a dipping test using a tin plate, no micro particles are observed by microscope. The result of the gloss test on an electrocoated plate is shown in Table 1.

COMPARATIVE EXAMPLE 7

One hundred gram of pigment paste of Production example 5 was added to 400 g of the resin emulsion D before heating to form a cationic electrocoating composition. In the electrocoating composition, an article serving as a cathode was electrocoated and then baked at 170° C. for 20 minutes to obtain a cured coating having a thickness of 20 micron. The same test as Example 1 was conducted and the result is shown in Table 1.

TABLE 1

| Examples | 60° Gloss |
| --- | --- |
| 1 | 13 |
| 2 | 11 |
| 3 | 10 |
| 4 | 8 |
| 5 | 12 |
| 6 | 18 |
| 7 | 20 |
| 8 | 15 |
| Comparative | |

TABLE 1-continued

| Example | 60° Gloss |
|---|---|
| 1 | 46 |
| 2 | 43 |
| 3 | 38 |
| 4 | 34 |
| 5 | 41 |
| 6 | 45 |
| 7 | 39 |

EXAMPLE 9

A cationic micro gel particle dispersion was prepared from the following ingredients.

| Ingredients | Parts by weight | Solid content % |
|---|---|---|
| Strontium chromate | 25 | 25 |
| Beta-hydroxy phenol ether compound | 36.75 | 25 |
| Aminated polybutadiene A | 66.7 | 50 |
| Cobalt naphthenate | 1.67 | 1.67 |
| Glacial acetic acid | 1.8 | |
| Deionized water | 382 | |

Strontium chromate was mixed with beta-hydroxyphenol ether compound and glass beads, and ground by a sand mill. Aminated polybutadiene A, cobalt naphthenate and glacial acetic acid were added and then emulsified by adding deionized water. Deionized water was further added to the emulsion, while the solvent was removed under reduced pressure. The resultant resin emulsion F was allowed to stand at 55° C. for 7 days and then cool to form a cationic micro gel particle dispersion.

The dispersion was added to a large amount of tetrahydrofuran to rinse. A tin plate was dipped in the dispersion and dried by air and then under reduced pressure. The obtained tin plate was observed by a microscope to see a micro particle covering a strontium chromate particle with a crosslinked resin layer.

The emulsion which was not heated is added to a large amount of tetrahydrofuran and strontium chromate having no cover layer was observed by a microscope.

EXAMPLE 10

A cationic micro gel particle dispersion was prepared from the following ingredients.

| Ingredients | Parts by weight | Solid content % |
|---|---|---|
| Strontium chromate | 25 | 25 |
| Aminated polybutadiene | 66.7 | 50 |
| Tetrabromobisphenol A | 25 | 25 |
| Xylene | 10 | |
| Ethylene glycol monobutyl ether | 10 | |
| Ethylene glycol monoethyl ether | 5 | |
| Cobalt naphthenate | 1.67 | 1.67 |
| Acetic acid | 1.8 | |
| Deionized water | 363 | |

Strontium chromate was mixed with aminated polybutadiene and ground by a sand mill. A solution dissolving tetrabromobisphenol A with xylene, ethylene glycol monobutyl ether and ethylene glycol monoethyl ether were added and then cobalt naphthenate and acetic acid were added to mix uniformly. The mixture was then emulsified by adding deionized water. Deionized water was further added to the emulsion, while the solvent was removed under reduced pressure. The resultant resin emulsion G was allowed to stand at 55° C. for 7 days and then cool to form a cationic micro gel particle dispersion.

The dispersion was added to a large amount of tetrahydrofuran to rinse. A tin plate was dipped in the dispersion and dried by air and then under reduced pressure. The obtained tin plate was observed by a microscope to see a micro particle covering a strontium chromate particle with a crosslinked resin layer.

The emulsion which was not heated is added to a large amount of tetrahydrofuran and strontium chromate having no cover layer was observed by a microscope.

What is claimed is:

1. A process for preparing a cationic micro gel particle dispersion comprising:
   emulsifying in an aqueous medium a resin composition comprising
   (A) 100 parts by weight of a cationic film-forming aqueous polybutadiene resin having amino groups, and
   (B) 10 to 250 parts by weight of a thermosetting crosslinking agent which is self-crosslinked or crosslinked with said aqueous resin (A) in terms of condensation or addition reaction;
   parts by weight being based on the solid content of the resin composition, and
   heating the resultant emulsion to above a crosslinkable temperature of said crosslinking agent (B).

2. An aqueous coating composition comprising the cationic micro gel particle dispersion of claim 1.

3. The process according to claim 1 wherein the crosslinking agent (B) is methylol phenols obtained by reacting phenols with formaldehyde.

4. The process according to claim 3 wherein the methylol phenols are beta-hydroxyphenol ether.

5. The process according to claim 1 wherein the crosslinking agent (B) is tetrabromobisphenol A.

6. The process according to claim 1 wherein the heating is conducted at atmospheric pressure or under pressure.

7. The process according to claim 1 wherein the emulsion additionally comprises an organic solvent which is removed before or during the heating step.

8. The process according to claim 1 or claim 7 wherein the emulsion further comprises a solid particle.

9. The process according to claim 8 wherein the solid particle is a pigment.

10. A micro gel particle obtained by the process of claim 1.

11. A micro gel particle obtained by the process of claim 8.

* * * * *